(12) United States Patent
Lingenfelter et al.

(10) Patent No.: US 8,262,882 B2
(45) Date of Patent: Sep. 11, 2012

(54) METHODS FOR PASSIVATING A METAL SUBSTRATE AND RELATED COATED METAL SUBSTRATES

(75) Inventors: Thor Lingenfelter, Evans City, PA (US); Richard F Karabin, Ruffs Dale, PA (US); Edward F Rakiewicz, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 367 days.

(21) Appl. No.: 12/463,856

(22) Filed: May 11, 2009

(65) Prior Publication Data

US 2010/0285334 A1 Nov. 11, 2010

(51) Int. Cl.
*C25D 13/12* (2006.01)
(52) U.S. Cl. ........................................ 204/486; 204/488
(58) Field of Classification Search .................. 204/484, 204/488, 486
See application file for complete search history.

(56) References Cited

U.S. PATENT DOCUMENTS

| | | | |
|---|---|---|---|
| 6,290,830 B1 | 9/2001 | Kaylo et al. | |
| 7,241,371 B2 * | 7/2007 | Stoffer et al. | 204/489 |
| 7,906,002 B2 * | 3/2011 | Shimoda et al. | 204/484 |
| 2004/0050704 A1 | 3/2004 | Rakiewicz et al. | |

FOREIGN PATENT DOCUMENTS

WO WO2006109862 A1 10/2006
* cited by examiner

*Primary Examiner* — Kishor Mayekar

(57) ABSTRACT

Disclosed are methods for passivating metal substrates, including ferrous substrates, such as cold rolled steel and electrogalvanized steel. The methods comprise the steps of autodepositing copper, silver, a IIIB metal and/or IVB metal onto at least a portion of the substrate, and simultaneously and/or immediately subsequently electrophoretically depositing on the substrate a curable, electrodepositable coating composition; wherein the copper, silver, IIB metal and/or IVB metal and the curable, electrodepositable coating composition are both contained within a single bath composition. The present invention also relates to coated substrates produced by the above methods.

15 Claims, No Drawings

METHODS FOR PASSIVATING A METAL SUBSTRATE AND RELATED COATED METAL SUBSTRATES

FIELD OF THE INVENTION

The present invention relates to methods for coating and passivating a metal substrate, including ferrous substrates, such as cold rolled steel and electrogalvanized steel. The present invention also relates to coated metal substrates.

BACKGROUND INFORMATION

The use of protective coatings on metal substrates for improved corrosion resistance and paint adhesion is common. Conventional techniques for coating such substrates include techniques that involve pretreating the metal substrate with a phosphate conversion coating and chrome-containing rinses. Such techniques often involve multiple time- and space-consuming treatment steps. The use of such phosphate and/or chromate-containing compositions, moreover, often raises environmental and health concerns, particularly with respect to their disposal.

In order to address environmental concerns, chromate-free and/or phosphate-free pretreatment compositions have been developed. Such compositions are generally based on chemical mixtures that in some way react with the substrate surface and bind to it to form a protective layer. For example, pretreatment compositions based on a group IIIB or IVB metal compound have recently become more prevalent. In some cases, it has been proposed to include copper in such compositions to improve the corrosion resisting properties of the composition. The corrosion resistance capability of these pretreatment compositions, however, even when copper is included, has generally been significantly inferior to conventional phosphate and/or chromium containing pretreatments. Moreover, the inclusion of copper in such compositions can result in the discoloration of some subsequently applied coatings, such as certain electrodeposited coatings, particularly non-black coatings. In addition, inclusion of copper in the pretreatment composition can make it more difficult to maintain the proper composition of materials in the pretreatment bath, as copper tends to deposit onto the metal surface at a rate different from the other metals in the composition.

As a result, it would be desirable to provide methods for treating a metal substrate that overcome at least some of the previously described drawbacks of the prior art, including the environmental drawbacks associated with the use of chromates and/or phosphates. Moreover, it would be desirable to provide methods for treating metal substrate that, in at least some cases, imparts corrosion resistance properties that are equivalent to, or even superior to, the corrosion resistance properties impart through the use of phosphate conversion coatings. It would also be desirable to provide related coated metal substrates.

SUMMARY OF THE INVENTION

The present invention is directed to methods for passivating a metal substrate surface. The methods comprise the steps of: (a) exposing the substrate to a bath composition that contains copper, silver, a IIIB metal and/or a IVB metal for at least 5 seconds, thereby autodepositing copper, silver, a IIIB metal and/or a IVB metal onto at least a portion of the substrate, and (b) simultaneously and/or immediately subsequently to step (a), electrophoretically depositing on the substrate a curable, electrodepositable coating composition. The metal and the curable, electrodepositable coating composition are both contained within a single bath composition. The present invention is also directed to substrates treated thereby.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, the present invention is directed to methods for treating (passivating) a metal substrate. Suitable metal substrates for use in the present invention include those that are often used in the assembly of automotive bodies, automotive parts, and other articles, such as small metal parts, including fasteners, i.e., nuts, bolts, screws, pins, nails, clips, buttons, and the like. Specific examples of suitable metal substrates include, but are not limited to, cold rolled steel, hot rolled steel, steel coated with zinc metal, zinc compounds, or zinc alloys, such as electrogalvanized steel, hot-dipped galvanized steel, galvanealed steel, and steel plated with zinc alloy. Also, aluminum alloys, aluminum plated steel and aluminum alloy plated steel substrates may be used. Other suitable non-ferrous metals include copper and magnesium, as well as alloys of these materials. Moreover, the bare metal substrate being coating by the methods of the present invention may be a cut edge of a substrate that is otherwise treated and/or coated over the rest of its surface. The metal substrate coated in accordance with the methods of the present invention may be in the form of, for example, a sheet of metal or a fabricated part.

The substrate to be treated in accordance with the methods of the present invention may first be cleaned to remove grease, dirt, or other extraneous matter. This is often done by employing mild or strong alkaline cleaners, such as are commercially available and conventionally used in metal pretreatment processes. Examples of alkaline cleaners suitable for use in the present invention include CHEMKLEEN 163, CHEMKLEEN 177, and CHEMKLEEN 490MX, each of which is commercially available from PPG Industries, Inc. Such cleaners are often preceded and/or followed by a water rinse.

In step (a) of the present invention, copper, silver, a IIIB metal and/or a IVB metal is autodeposited on at least a portion of the substrate. The metal is typically deposited by contacting the substrate with an aqueous bath composition containing a soluble copper metal salt, silver metal salt, a group IIIB metal compound and/or IVB metal compound, wherein the metal of the substrate dissolves while the metal in the solution is plated out onto the substrate surface. Exposure to the bath composition is for at least 5 seconds, often at least 10 seconds, or even for at least 30 seconds.

Specific examples of water soluble copper compounds which are suitable for use in the present invention include, but are not limited to, copper cyanide, copper sulfate, copper nitrate, copper pyrophosphate, copper thiocyanate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartarate, copper malate, copper succinate, copper malonate, copper maleate, copper benzoate, copper salicylate, copper aspartate, copper glutamate, copper fumarate, copper glycerophosphate, copper fluorosilicate, copper fluoroborate and copper iodate, copper salts of carboxylic acids in the homologous series formic acid to decanoic acid, copper salts of polybasic acids in the series oxalic acid to suberic acid, and copper salts of hydroxycarboxylic acids, including glycolic, lactic, tartaric, malic and citric acids.

When copper ions supplied from such a water-soluble copper compound are precipitated as an impurity in the form of copper sulfate, copper oxide, etc., it may be preferable to add a complexing agent that suppresses the precipitation of copper ions, thus stabilizing them as a copper complex in the bath composition.

In certain embodiments, the copper compound is added as a copper complex salt such as $K_3Cu(CN)_4$ or Cu-EDTA, which can be present stably in the bath composition on its own, but it is also possible to form a copper complex that can be present stably in the plating solution by combining a complexing agent with a compound that is difficultly soluble on its own. Examples thereof include a copper cyanide complex formed by a combination of CuCN and KCN or a combination of CuSCN and KSCN or KCN, and a Cu-EDTA complex formed by a combination of $CuSO_4$ and EDTA.2Na.

With regard to the complexing agent, a compound that can form a complex with copper ions can be used; examples thereof include inorganic compounds, such as cyanide compounds and thiocyanate compounds, and polycarboxylic acids, and specific examples thereof include ethylenediaminetetraacetic acid, salts of ethylenediaminetetraacetic acid, such as dihydrogen disodium ethylenediaminetetraacetate dihydrate, aminocarboxylic acids, such as nitrilotriacetic acid and iminodiacetic acid, oxycarboxylic acids, such as citric acid and tartaric acid, succinic acid, oxalic acid, ethylenediaminetetramethylenephosphonic acid, and glycine.

As used herein, the term "group IIIB and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metal themselves may be used. In certain embodiments, a group IIIB and/or IVB metal compound is used. As used herein, the term "group IIIB and/or IVB metal compound" refers to compounds that include at least one element that is in group IIIB or group IVB of the CAS Periodic Table of the Elements.

In certain embodiments, the group IIIB and/or IVB metal compound used in the bath composition is a compound of zirconium, titanium, hafnium, yttrium, scandium, lanthanum or a mixture thereof. Suitable compounds of zirconium include, but are not limited to, hexafluorozirconic acid, alkali metal and ammonium salts thereof, ammonium zirconium carbonate, zirconyl nitrate, zirconium carboxylates and zirconium hydroxy carboxylates, such as hydrofluorozirconic acid, zirconium acetate, zirconium oxalate, ammonium zirconium glycolate, ammonium zirconium lactate, ammonium zirconium citrate, and mixtures thereof. Suitable compounds of titanium include, but are not limited to, fluorotitanic acid and its salts. A suitable compound of hafnium includes, but is not limited to, hafnium nitrate.

Yttrium nitrate, a readily available yttrium compound, is a suitable yttrium source. Other yttrium compounds suitable for use in the bath compositions are organic and inorganic yttrium compounds such as yttrium oxide, yttrium bromide, yttrium hydroxide, yttrium molybdate, yttrium sulfate, yttrium silicate, and yttrium oxalate. Organoyttrium complexes and yttrium metal can also be used. A suitable compound of lanthanum includes, but is not limited to, lanthanum nitrate hydrate.

In certain embodiments, the metal to be autodeposited is included in the bath composition in an amount of at least 1 part per million ("ppm"), such as at least 50 ppm, or, in some cases, at least 100 ppm of total metal (measured as elemental metal). In certain embodiments, the copper metal is included in the bath composition in an amount of no more than 5,000 ppm, such as no more than 1,000 ppm, or, in some cases, no more than 500 ppm of total metal (measured as elemental metal). The amount of copper metal in the bath composition can range between any combination of the recited values inclusive of the recited values.

In certain embodiments, the group IIIB and/or IVB metal compound is present in the bath composition in an amount of at least 10 ppm metal, such as at least 100 ppm metal, or, in some cases, at least 150 ppm metal (measured as elemental metal). In certain embodiments, the group IIIB and/or IVB metal compound is present in the bath composition in an amount of no more than 5000 ppm metal, such as no more than 300 ppm metal, or, in some cases, no more than 250 ppm metal (measured as elemental metal). The amount of group IIIB and/or IVB metal in the bath composition can range between any combination of the recited values inclusive of the recited values.

The bath composition may be brought into contact with the substrate by dipping or immersion of the substrate. Typically the composition, when applied to the metal substrate, is at a temperature ranging from 60 to 185° F. (15 to 85° C.).

After autodeposition, the metal is present in a layer on the substrate in an amount ranging from 1 to 1000 milligrams per square meter ($mg/m^2$), such as 10 to 400 $mg/m^2$. The thickness of the metal layer can vary, but it is generally very thin, often having a thickness of less than 1 micrometer, in some cases it is from 1 to 500 nanometers, and, in yet other cases, it is 10 to 300 nanometers.

In step (b) of the method of the present invention, an electrodepositable composition is deposited onto the metal substrate by electrodeposition. In the process of electrodeposition, the metal substrate being treated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate.

Electrodeposition is usually carried out at a constant voltage in the range of from 1 volt to several thousand volts, typically between 50 and 500 volts, although various scenarios may be employed as described below. Current density is usually between 1.0 ampere and 15 amperes per square foot (10.8 to 161.5 amperes per square meter) and tends to decrease quickly during the electrodeposition process, indicating formation of a continuous self-insulating film.

The electrodepositable composition utilized in certain embodiments of the present invention often comprises a resinous phase dispersed in an aqueous medium wherein the resinous phase comprises: (a) an active hydrogen group-containing ionic electrodepositable resin, and (b) a curing agent having functional groups reactive with the active hydrogen groups of (a).

In certain embodiments, the electrodepositable compositions utilized in certain embodiments of the present invention contain, as a main film-forming polymer, an active hydrogen-containing ionic, often cationic, electrodepositable resin. A wide variety of electrodepositable film-forming resins are known and can be used in the present invention so long as the polymers are "water dispersible," i.e., adapted to be solubilized, dispersed or emulsified in water. The water dispersible polymer is ionic in nature, that is, the polymer will contain anionic functional groups to impart a negative charge or, as is often preferred, cationic functional groups to impart a positive charge.

Examples of film-forming resins suitable for use in anionic electrodepositable compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable electrodepositable film-forming resin comprises an alkyd-aminoplast vehicle, i.e., a vehicle containing an alkyd resin and an amine-aldehyde resin. Yet another anionic electrodepositable resin composition comprises mixed esters of a resinous polyol, such as is described in U.S. Pat. No. 3,749,657 at col. 9, lines 1 to 75 and col. 10, lines 1 to 13, the cited portion of which being incorporated herein by reference. Other acid functional polymers can also be used, such as phosphatized polyepoxide or phosphatized acrylic polymers as are known to those skilled in the art.

As aforementioned, it is often desirable that the active hydrogen-containing ionic electrodepositable resin (a) is cationic and capable of deposition on a cathode. Examples of such cationic film-forming resins include amine salt group-containing resins, such as the acid-solubilized reaction products of polyepoxides and primary or secondary amines, such as those described in U.S. Pat. Nos. 3,663,389; 3,984,299; 3,947,338; and 3,947,339. Often, these amine salt group-containing resins are used in combination with a blocked isocyanate curing agent. The isocyanate can be fully blocked, as described in U.S. Pat. No. 3,984,299, or the isocyanate can be partially blocked and reacted with the resin backbone, such as is described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins, such as those described in U.S. Pat. Nos. 3,455,806 and 3,928,157.

Besides amine salt group-containing resins, quaternary ammonium salt group-containing resins can also be employed, such as those formed from reacting an organic polyepoxide with a tertiary amine salt as described in U.S. Pat. Nos. 3,962,165; 3,975,346; and 4,001,101. Examples of other cationic resins are ternary sulfonium salt group-containing resins and quaternary phosphonium salt-group containing resins, such as those described in U.S. Pat. Nos. 3,793,278 and 3,984,922, respectively. Also, film-forming resins which cure via transesterification, such as described in European Application No. 12463 can be used. Further, cationic compositions prepared from Mannich bases, such as described in U.S. Pat. No. 4,134,932, can be used.

In certain embodiments, the resins present in the electrodepositable composition are positively charged resins which contain primary and/or secondary amine groups, such as described in U.S. Pat. Nos. 3,663,389; 3,947,339; and 4,116,900. In U.S. Pat. No. 3,947,339, a polyketimine derivative of a polyamine, such as diethylenetriamine or triethylenetetraamine, is reacted with a polyepoxide. When the reaction product is neutralized with acid and dispersed in water, free primary amine groups are generated. Also, equivalent products are formed when polyepoxide is reacted with excess polyamines, such as diethylenetriamine and triethylenetetraamine, and the excess polyamine vacuum stripped from the reaction mixture, as described in U.S. Pat. Nos. 3,663,389 and 4,116,900.

In certain embodiments, the active hydrogen-containing ionic electrodepositable resin is present in the electrodepositable composition in an amount of 1 to 60 percent by weight, such as 5 to 25 percent by weight, based on total weight of the electrodeposition bath.

As indicated, the resinous phase of the electrodepositable composition often further comprises a curing agent adapted to react with the active hydrogen groups of the ionic electrodepositable resin. For example, both blocked organic polyisocyanate and aminoplast curing agents are suitable for use in the present invention, although blocked isocyanates are often preferred for cathodic electrodeposition.

Aminoplast resins, which are often the preferred curing agent for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes, such as acetaldehyde and furfural. The condensation products contain methylol groups or similar alkylol groups depending on the particular aldehyde employed. Often, these methylol groups are etherified by reaction with an alcohol, such as a monohydric alcohol containing from 1 to 4 carbon atoms, such as methanol, ethanol, isopropanol, and n-butanol. Aminoplast resins are commercially available from American Cyanamid Co. under the trademark CYMEL and from Monsanto Chemical Co. under the trademark RESIMENE.

The aminoplast curing agents are often utilized in conjunction with the active hydrogen containing anionic electrodepositable resin in amounts ranging from 5 percent to 60 percent by weight, such as from 20 percent to 40 percent by weight, the percentages based on the total weight of the resin solids in the electrodepositable composition.

As indicated, blocked organic polyisocyanates are often used as the curing agent in cathodic electrodeposition compositions. The polyisocyanates can be fully blocked as described in U.S. Pat. No. 3,984,299 at col. 1, lines 1 to 68, col. 2, and col. 3, lines 1 to 15, or partially blocked and reacted with the polymer backbone as described in U.S. Pat. No. 3,947,338 at col. 2, lines 65 to 68, col. 3, and col. 4 lines 1 to 30, the cited portions of which being incorporated herein by reference. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates can be used. An example would include triphenylmethane-4,4',4"-triisocyanate. Isocyanate ( )-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from 5 percent to 60 percent by weight, such as from 20 percent to 50 percent by weight, the percentages based on the total weight of the resin solids of the electrodepositable composition.

The electrodepositable compositions described herein are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, often less than 0.15 micron.

The concentration of the resinous phase in the aqueous medium is often at least 1 percent by weight, such as from 2 to 60 percent by weight, based on total weight of the aqueous dispersion. When such compositions are in the form of resin concentrates, they generally have a resin solids content of 20 to 60 percent by weight based on weight of the aqueous dispersion.

The electrodepositable compositions described herein are often supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

As aforementioned, besides water, the aqueous medium may contain a coalescing solvent. Useful coalescing solvents are often hydrocarbons, alcohols, esters, ethers and ketones. The preferred coalescing solvents are often alcohols, polyols and ketones. Specific coalescing solvents include isopropanol, butanol, 2-ethylhexanol, isophorone, 2-methoxypentanone, ethylene and propylene glycol and the monoethyl monobutyl and monohexyl ethers of ethylene glycol. The amount of coalescing solvent is generally between 0.01 and 25 percent, such as from 0.05 to 5 percent by weight based on total weight of the aqueous medium.

In addition, a colorant and, if desired, various additives such as surfactants, wetting agents or catalyst can be included in the coating composition comprising a film-forming resin. As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Examples of special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the compositions.

In addition to the water soluble copper metal salt and optional complexing agent, the bath composition may also include other additives. For example, a stabilizer, such as 2-mercaptobenzothiazole, may be used. Other optional materials include surfactants that function as defoamers or substrate wetting agents. Anionic, cationic, amphoteric, or nonionic surfactants may be used. Compatible mixtures of such materials are also suitable. Defoaming surfactants are often present at levels up to 1 percent, such as up to 0.1 percent by volume, and wetting agents are often present at levels up to 2 percent, such as up to 0.5 percent by volume, based on the total volume of the bath composition.

As noted above, in step (a) of the present invention, metal is autodeposited on at least a portion of the substrate. The deposition may be accomplished without the use of electric current; when step (b) is performed subsequently to step (a), the copper, silver, IIIB metal and/or IVB metal is deposited onto the substrate in the absence of an applied electrical current in step (a).

In the method of the present invention, deposition of the copper, silver, IIIB metal and/or IVB metal onto the surface of the metal substrate in step (a) may be conducted simultaneously with, or is immediately followed by (b) electrophoretically depositing on the substrate a curable, electrodepositable coating composition. By "immediately following" and "immediately subsequently" as used here and in the claims is meant that there are no intervening substantive treatment steps such as contact with a conventional pretreatment composition as mentioned above. Steps (a) and (b) may be conducted in such a manner because the metal to be autodeposited (copper, silver, IIIB metal and/or IVB metal) and the curable, electrodepositable coating composition are both contained within a single bath composition.

After deposition of the metal, whether or not such deposition occurred with an applied electrical current, the voltage may be gradually and continuously increased to 200V for the remainder of the process. Alternatively, after deposition of the metal, the voltage of the applied electrical current may be increased in incremental stages or steps. In this scenario, the voltage is increased from 0V to 300V in 5 seconds, preferably 0V to 200V in 15 seconds and is held for 60 seconds, then increased to 300 to 400V and held until a desired coating thickness is achieved. In yet another embodiment, concurrently or after deposition of the metal onto the substrate, a current may be applied at a constant voltage for electrodeposition of the curable coating composition.

After removal of the substrate from the bath composition, the substrate may, if desired, be rinsed with water such as deionized water and/or dried. Thereafter, the coated substrate is often heated to cure the deposited composition. The heating or curing operation is often carried out at a temperature in the range of from 250 to 400° F. (121.1 to 204.4° C.), such as from 120 to 190° C., for a period of time sufficient to effect cure of the electrodepositable composition, typically ranging from 10 to 60 minutes. In certain embodiments, the thickness of the resultant film is from 10 to 50 microns.

It is noteworthy that in the method of the present invention, the metal substrate is not contacted with any pretreatment composition other than the bath composition. As used herein, the term "pretreatment composition" refers to a composition that, upon contact with the substrate, reacts with and chemically alters the substrate surface and binds to it to form a protective layer. Moreover, the bath composition used in the method of the present invention is essentially free of metal phosphates and chromates that are found in conventional pretreatment compositions. By "essentially free of metal phosphates and chromates" is meant that if a metal phosphate or chromate is present in the composition, it is present incidentally and preferably in less than trace amounts. It is an advantage of the present invention that metal surfaces can be passivated by following the methods of the present invention without the use of conventional pretreatment compositions such as trication phosphate metal solutions and methods using these solutions, which often involve twelve to fifteen process stages, and yet corrosion resistance comparable to that shown by metal substrates treated conventionally can be achieved by the methods of the present invention.

Illustrating the invention are the following examples that are not to be considered as limiting the invention to their details. All parts and percentages in the examples, as well as throughout the specification, are by weight unless otherwise indicated.

Example A

Cationic Resin: A cationic resin was prepared from a mixture of the following materials.

| # | Material | Parts |
|---|---|---|
| 1 | urethane crosslinker (see Ex. A-2) | 988.3 |
| 2 | MAZON 1651 from BASF Corp. | 57.1 |
| 3 | EPON 828 from Hexion Specialty Chemicals | 528.7 |
| 4 | Bisphenol A | 203.9 |
| 5 | TETRONIC 150R1 from BASF Corp. | 0.18 |
| 6 | Diethanolamine | 36.1 |
| 7 | Aminopropyldiethanolamine | 79.2 |
| 8 | EPON 828 from Hexion Specialty Chemicals | 5.74 |
| 9 | Sulfamic acid | 29.8 |
| 10 | Deionized water | 1001 |
| 11 | 88% lactic acid | 1.2 |
| 12 | Additive resin (see Ex. A-3) | 126.5 |
| 13 | Gum rosin solution[1] | 14.1 |
| 14 | Deionized water | 1045 |

[1]A solution of 30% gum rosin in MAZON 1651.
[1]MDI type isocyanate available from Bayer Corporation.
[2]Available from BASF Corporation.

To a 5 liter flask equipped with a stirrer, temperature probe, and Dean-Stark Trap, materials 1 through 5 are charged while stirring under a nitrogen blanket. The mixture is heated to 75° C. and Material 6 is added. The mixture exotherms to about 80° C. and is held for 30 minutes. Material 7 is added and the temperature is adjusted to 132° C. and held for 90 minutes while collecting 29.3 parts solvent in Dean-Stark trap. To this, Material 8 is added and the temperature is held at 132° C. for an additional hour. 1630 parts of this mixture is poured into a mixture of Materials 9, 10, 11, and 12 while stirring. To this, Material 12 is added and the mixture is stirred for 30 minutes. Material 13 is then added while stirring. Solvent and water are removed via vacuum distillation until solids of the mixture is about 40%.

Example A-2

Urethane crosslinker is prepared by adding 1320 g (10 eq.) of DESMODUR LS 2096[1] to a mixture of 92 g ethanol, 456 g propylene glycol, 740 g MACOL 98 B2, and 486 g MAZON 1651 and 93 g methylisobutyl ketone. 68 g of methylisobutyl ketone is used as a rinse for the isocyanate. The temperature is allowed to increase to 115° C. and the mixture is held until the infrared spectrum indicates the absence of isocyanate.

Example A-3

| # | Material | Parts |
|---|---|---|
| 1 | MAZEEN 355 70[1] | 1423.49 |
| 2 | acetic acid | 15.12 |
| 3 | Dibutyltindilaurate | 1.52 |
| 4 | Toluene diisocyanate 80/20 | 200.50 |
| 5 | sulfamic acid | 79.73 |
| 6 | deionized H$_2$O | 1623.68 |
| 7 | deionized H$_2$O | 766.89 |

[1]Amine functional diol of amine equivalent weight 1131 available from BASF Corporation Items 1 and 2 are charged to a 4 neck round bottom flask, fit with a stirrer, temperature measuring probe and N$_2$ blanket and mixed for 10 minutes. Item 3 is added and then item 4 is charged over about 1 hour allowing the reaction mixture to exotherm to a maximum temperature of 100° C. The mixture is then held at 100° C. until the infrared spectrum indicates the absence of isocyanate (approximately 1 hour). 1395 g of the reaction mixture is poured into a mixture of items 5 and 6 and mixed for 1 hour. Item 7 is then added over about 1 hour and mixed for about 1 hour. The resulting aqueous solution had a solids content of about 36%.

Example B

Grind Resin: This example describes the preparation of a quaternary ammonium salt containing pigment-grinding resin. Example B-1 describes the preparation of an amine-acid salt quaternizing agent and Example B-2 describes the preparation of an epoxy group-containing polymer that is subsequently quaternized with the amine-acid salt of Example B-1.

Example B-1

The amine-acid salt quaternizing agent was prepared using the following procedure:

| # | Material | Parts |
|---|---|---|
| 1 | Dimethyl ethanolamine | 445 |
| 2 | PAPI 290 available from Dow Chemical Co. | 660 |
| 3 | MAZON 1651 available from BASF Corp. | 22.1 |
| 4 | 88% lactic acid aqueous | 512 |
| 5 | DI water | 2136.11 |

To a suitably equipped 5 liter flask were added material 1 was charged. Material 2 was then charged under mild agitation over a 1.5 hour period, followed by a rinse of material 3. During this addition, the reaction mixture was allowed to exotherm to a temperature of about 89° C. and held at that temperature for about 1 hour until complete reaction of the isocyanate as determined by infrared spectroscopy. At that time, material 4 was added over a 25 minute period, followed material 5. The reaction temperature was held at about 80° C. for about 6 hours until a stalled acid value of 70.6 was obtained.

Example B-2

The quaternary ammonium salt group-containing polymer was prepared using the following procedure.

| # | Material | Parts |
|---|---|---|
| 1 | Bisphenol A Digylcidyl ether available from Resolution Chemical Co. as Epon 828 | 528.8 |
| 2 | Bisphenol A | 224.9 |
| 3 | MAZON 1651 | 83.7 |
| 4 | Ethyltriphenylphosphonium iodide | 0.5 |
| 5 | MAZON 1651 | 164.9 |
| 6 | amine-acid quaternizing agent of B-1 | 418.4 |
| 7 | DI water | 1428.1 |
| 8 | MAZON 1651 | 334.7 |

Material 1 was charged to a suitably equipped 5 liter flask were added, under mild agitation. Material 2 was then added followed by material 3 and material 4. The reaction mixture was heated to about 140° C., allowed to exotherm to about 180° C., then cooled to about 160° C. and held at that temperature for about 1 hour. At that time the polymeric product had an epoxy equivalent weight of 982.9. The reaction mixture was then cooled to a temperature of about 130° C. at which time material 5 was added and the temperature lowered to about 95°-100° C., followed by the addition of material 6, the amine-acid quaternizing agent of B-1 over a period of 15 minutes, and subsequently followed by the addition of about 1428.1 parts by weight of deionized water. The reaction temperature was held at about 80° C. for approximately 6 hours until the acid number of the reaction product fell below 1.0. The resultant quaternary ammonium salt group-containing pigment grinding resin was further reduced with about 334.7 parts by weight of the solvent of MAZON 1651.

Example C

Pigment Paste A: This example describes the preparation of a pigment paste suitable for use in the electrodeposition bath compositions of the present invention. The pigment paste was prepared with the following ingredients:

| Weight (grams) | Material |
|---|---|
| 389.5 | Quaternary ammonium salt group containing grind resin of Example C |
| 189.1 | Catalyst paste |
| 19.8 | SURFYNOL GA surfactant from Air Products & Chemicals Inc. |
| 9.6 | Ethylene Glycol Monohexylether from BASF Corp. |
| 9.6 | N-Butoxypropanol from Dow Chemical Co. |
| 4.8 | PRINTEX 200 carbon black from Evonik Pigments |
| 1.6 | ACEMATT OK412 LC from Degussa |
| 0.3 | Calcium Oxide from Mississippi Lime Co. |
| 148.8 | Aluminum silicate clay available from BASF Catalysts LLC |
| 279.3 | Titanium Dioxide from Tronox Inc. |
| 9.4 | BLANC FIXE from Sachtleben Co. |
| 100 | DI water |

The above ingredients were first dispersed with a high speed Cowles blade for 30 minutes, and then transferred to a vertical sand mill and ground to a Hegman value of about 7.

Pigment Paste B: This example describes the preparation of a pigment paste suitable for use in the electrodeposition bath compositions of the present invention. The pigment paste was prepared with the following ingredients:

| Weight (grams) | Material |
|---|---|
| 334.7 | Quaternary ammonium salt group containing grind resin of Example C |
| 163.1 | Catalyst paste |
| 17.0 | SURFYNOL GA surfactant from Air Products & Chemicals Inc. |
| 8.3 | Ethylene Glycol Monohexylether from BASF Corp. |
| 8.3 | N-Butoxypropanol from Dow Chemical Co. |
| 4.4 | PRINTEX 200 carbon black from Evonik Pigments |
| 1431.8 | Aluminum silicate clay available from BASF Catalysts LLC |
| 246.6 | Titanium Dioxide from Tronox Inc. |
| 85.8 | DI water |

The above ingredients were first dispersed with a high speed Cowles blade for 30 minutes, and then transferred to a vertical sand mill and ground to a Hegman value of about 7.

Catalyst paste: The catalyst paste was prepared from a mixture of the following ingredients:

| Weight (grams) | Material |
|---|---|
| 420.1 | Quaternary ammonium salt group containing grind resin of Example C |
| 37.3 | MAZON 1651 |
| 25.8 | n-Butoxypropanol |
| 368 | STANN BO Di-n-butyltin oxide available from Sankyo Organic Chemicals Co., Ltd. |
| 92 | DI Water |

The above ingredients were added in the order shown under high shear agitation. After the ingredients were thoroughly blended, the pigment paste was transferred to a vertical sand mill and ground to a Hegman value of about 7.25.

Example D

Resin Blend: This example describes the preparation of a master batch of the resin blend that was used in the Paints 1 and 2 below.

| Weight (grams) | Material |
|---|---|
| 853.1 | Cationic resin from Example A |
| 89.7 | Flexibilizer[1] |
| 11.8 | Plasticizer[2] |
| 4.4 | Propylene Glycol monomethyl ether from BASF Corp. |
| 2.2 | Ethylene Glycol Monohexylether from BASF Corp. |
| 43.6 | Flow additive[3] |

[1]711 g of DER732, and 164.5 g bisphenol A are charged to a suitably equipped 3-liter round-bottomed flask. The mixture is heated to 130° C. and 1.65 g benzyldimethyl amine is added. The reaction mixture is held at 135° C. until the epoxide equivalent weight of the mixture is 1232. 78.8 g of BUTYL CARBITOL formal[3] is added and then the mixture is cooled to 95° C. 184.7 g JEFFAMINE D400[2] is added and the reaction held at 95° C. until the Gardner-Holdt viscosity of a sample of the resin diluted 50/50 in methoxy propanol is "HJ". A mixture of 19.1 g EPON 828 and 3.4 g BUTYL CARBITOL formal is added and the mixture held until the Gardner-Holdt viscosity of a sample of the resin diluted 50/50 in methoxy propanol is "Q-". 988.6 g of this resin is poured into a mixture of 1242.13 g deionized water and 30.2 g sulfamic acid mixed for 30 minutes. 614.8 g deionized water is then added and mixed well. The final aqueous dispersion had a measured solids content of 35.8%
[1]Aliphatic epoxy resin available from Dow Chemical Co.
[2]Polyoxypropylene diamine available from Huntsman Corp.
[3]Available as MAZON 1651 from BASF Corporation
[2]Reaction product of 2 moles of diethylene glycol monobutyl ether and 1 mole formaldehyde, 98% active, prepared as described in U.S. Pat. No. 4,891,111 to McCollum et al.
[3]Prepared by a process comprising mixing a cationic polyepoxideamine reaction product and a polyepoxide crosslinking agent as described in U.S. Pat. No. 5,096,556 to Corrigan et al.

Example E

Copper solution: This example describes the preparation of a soluble copper solution for use in the electrodeposition bath composition of Paint 1. The soluble copper solution was prepared from the following:

| Weight (grams) | Material |
|---|---|
| 5.7 | Copper (II) Acetate available from Sigma-Aldrich Corp. |
| 94.3 | DI water |

To a 4 oz jar, add water. The copper acetate is added and the mixture is stirred until all of the material is dissolved.

Silver solution: This example describes the preparation of a soluble silver solution for use in the electrodeposition bath composition of Paint 2. The soluble silver solution was prepared from the following:

| Weight (grams) | Material |
|---|---|
| 1.7 | Silver Nitrate available from Sigma-Aldrich Corp. |
| 98.3 | DI water |

To a 4 oz jar, add water. The silver nitrate is added and the mixture is stirred until all of the material is dissolved.

Yttrium Solution: This example describes the preparation of a soluble yttrium solution for use in the electrodeposition bath compositions of Paint 3. The soluble yttrium solution was prepared from a mixture of the following:

| Weight (grams) | Material |
|---|---|
| 112.9 | Yttrium Trioxide |
| 485.0 | DI water |
| 291.3 | Sulfamic Acid |

To a suitably equipped 5 liter flask add sulfamic acid and water and stir for 20 minutes. Heat solution to 98° C. and then hold until a clear solution is obtained. Hold for at least 2 hours. Allow solution to cool below 50° C.

Example F

Paint Preparation: The following paints were made by adding the cationic resin blend from Example D into a 2000 mL glass beaker. The pigment paste is then diluted with about 200 grams of DI water before adding it to the resin blend while stirring. The remaining amount of water was added to the container. Final bath solids were about 21.5%, with a pigment to binder ratio of about 0.14. The test baths were ultrafiltered 20% and replenished with only fresh DI water. The metal solutions were added dropwise to the paint while under agitation.

| Weight (grams) | Material |
|---|---|
| Paint 1: | |
| 1004.6 | Resin blend from Example D |
| 128.6 | Pigment Paste A from Example C |
| 1066.8 | DI water |
| Paint 1A: | |
| 2200 | Paint 1 |
| 1.1 | Copper solution from Example E |
| Paint 1B: | |
| 2201 | Paint 1A |
| 9.9 | Copper solution from Example E |
| Paint 2: | |
| 1089.5 | Resin blend from Example D |
| 133.5 | Pigment Paste B from Example C |
| 977 | DI water |
| Paint 2A: | |
| 2200 | Paint 2 |
| 2.0 | Silver solution from Example E |
| Paint 2B: | |
| 2202 | Paint 2A |
| 18.0 | Silver solution from Example E |
| Paint 3: | |
| 1004.6 | Resin blend from Example D |
| 128.6 | Pigment Paste A from Example C |
| 1066.8 | DI water |
| Paint 3A: | |
| 2200 | Paint 3 |
| 11.0 | Yttrium solution from Example E |

Panel Preparation and Paint Application

The test substrate was 4"×6" ACT bare CRS panels that were cleaned in an alkaline cleaner and rinsed with DI water prior to use. The conditions for paint deposition were 20 coulombs, 200V, at 92° F. and were baked at 20 minutes at 350° F. to yield a cured film thickness of about 0.9 mils.

Two sets of panels were prepared for each metal amount. The first set of panels was immersed into the Baths 1, 2, and 3 with voltage applied within ten seconds after immersion. This set of panels are labeled 'As-is'. A second set of panels were immersed into the bath for five minutes before applying a voltage. This set of panels is labeled '5 min dwell'. After both sets of panels were coated out of Paints 1 through 3, Paints 1A, 2A, and 3A were made from them (see Example F). Another set of 'As-is' and '5 min dwell' panels were then coated out of Paints 1A, 2A, and 3A. In a similar fashion, Paints 1B and 2B were made from Paints 1A and 2A and a third set of panels were prepared as well.

Corrosion Results

A panel from each of the above sets was scribed with an "X" such that the scribe was through the coating to the substrate. The panels were immersed in a circulating 5% NaCl (by weight) water bath heated to 55° C. After 10 days, the panels were removed and abraded to remove any delaminated coating along the scribe. The width of the delaminated scribe is then measured and the results are given in Table 1 below:

TABLE 1

| Paint | Panel | Scribe width (mm) |
|---|---|---|
| 1 | As-is | 15 |
|   | 5 min dwell | 10 |

TABLE 1-continued

| Paint | Panel | Scribe width (mm) |
|---|---|---|
| 1A | As-is | 13 |
|  | 5 min dwell | 9 |
| 1B | As-is | 12 |
|  | 5 min dwell | 8 |
| 2 | As-is | >30 |
|  | 5 min dwell | 24 |
| 2A | As-is | >30 |
|  | 5 min dwell | 25 |
| 2B | As-is | 25 |
|  | 5 min dwell | 20 |
| 3 | As-is | 15 |
|  | 5 min dwell | 10 |
| 3A | As-is | 6 |
|  | 5 min dwell | 8 |

Analytical results

Out of each of the above paints, a panel was immersed for 5 minutes without any applied voltage. The panel was removed from the paint, rinsed with DI water, and analyzed by X-Ray Photoelectron Spectroscopy to quantify the amount of metal deposited on the surface. The results of the analysis are given in Table 2.

TABLE 2

| Paint | Atomic % Cu | Atomic % Ag | Atomic % Y |
|---|---|---|---|
| 1 | <0.1 | <0.1 | <0.1 |
| 1A | 1.4 | <0.1 | <0.1 |
| 1B | 5.0 | <0.1 | <0.1 |
| 2 | <0.1 | <0.1 | <0.1 |
| 2A | <0.1 | 1.0 | <0.1 |
| 2B | <0.1 | 2.5 | <0.1 |
| 3 | <0.1 | <0.1 | <0.1 |
| 3A | <0.1 | <0.1 | 1.3 |

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A method for passivating a metal substrate surface comprising:
   (a) exposing the substrate in the absence of an applied electrical current to a bath composition that contains a copper compound, a silver compound, a group IIIB metal compound, and/or a group IVB metal compound for at least 5 seconds, thereby autodepositing copper, silver, a IIIB metal and/or a IVB metal onto at least a portion of the substrate surface, and immediately subsequently
   (b) electrophoretically depositing on the substrate a curable, electrodepositable coating composition; wherein the copper compound, silver compound, group IIIB metal compound and/or a group IVB metal compound and the curable, electrodepositable coating composition are both contained within a single bath composition.

2. The method of claim 1, wherein an electrical current is applied to the bath in step (b) wherein the voltage is gradually and continuously increased to 200V.

3. The method of claim 1, wherein an electrical current is applied to the bath in step (b) wherein the voltage of the applied electrical current is increased in incremental stages; wherein the voltage is increased from 0V to 300V in 5 seconds and is held for 60 seconds, then increased to between 300 and 400V and held until a desired coating thickness is achieved.

4. The method of claim 1, wherein an electrical current is applied to the bath wherein the voltage of the applied electrical current is increased in incremental stages; wherein the voltage is increased from 0V to 200V in 15 seconds and is held for 60 seconds, then increased to 300 to 400V and held until a desired coating thickness is achieved.

5. The method of claim 1, wherein the substrate is exposed to the bath composition by immersion in the bath composition.

6. The method of claim 1, wherein the substrate is exposed to the bath composition for at least 10 seconds in step (a).

7. The method of claim 1, wherein the substrate is exposed to the bath composition for at least 30 seconds in step (a).

8. The method of claim 1, wherein the copper compound, silver compound, group IIIB metal compound and/or IVB metal compound is included in the bath composition in an amount of at least 100 ppm of total metal, measured as elemental metal.

9. The method of claim 8, wherein copper compound is present in the bath composition as copper cyanide, copper sulfate, copper nitrate, copper pyrophosphate, copper thiocyanate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartarate, copper malate, copper succinate, copper malonate, copper maleate, copper benzoate, copper salicylate, copper aspartate, copper glutamate, copper fumarate, copper glycerophosphate, copper fluorosilicate, copper fluoroborate and copper iodate, copper salts of carboxylic acids in the homologous series formic acid to decanoic acid, copper salts of polybasic acids in the series oxalic acid to suberic acid, and copper salts of glycolic, lactic, tartaric, malic and citric acids.

10. The method of claim 1, wherein the substrate is not contacted with any pretreatment composition other than the bath composition.

11. The method of claim 10, wherein the bath composition is essentially free of chromates and metal phosphates.

12. The method of claim 1, wherein the electrodepositable composition comprises a resinous phase dispersed in an aqueous medium wherein the resinous phase comprises:
   (i) an active hydrogen group-containing ionic electrodepositable resin, and
   (ii) a curing agent having functional groups reactive with the active hydrogen groups of (i).

13. The method of claim 12, wherein the ionic electrodepositable resin is cationic.

14. The method of claim 1, wherein step (b) includes heating the substrate after deposition of the curable, electrodepositable coating composition to a temperature of 250 to 400° F. (121.1 to 204.4° C.) for a time sufficient to effect cure of the electrodepositable composition.

15. The method of claim 1, wherein said group IIIB metal compound comprises a yttrium metal compound and wherein yttrium is autodeposited on the substrate surface in step (a).

* * * * *